May 7, 1968 B. E. DOTTER, JR 3,382,453

CIRCUIT FOR STABILIZING AN OSCILLATOR DURING INTERRUPTION OF SYNCHRONIZING SIGNAL

Filed April 10, 1967

INVENTOR.
BERTON E. DOTTER Jr.

BY

Glenn H. Antrim

ATTY.

United States Patent Office 3,382,453

Patented May 7, 1968

3,382,453

CIRCUIT FOR STABILIZING AN OSCILLATOR DURING INTERRUPTION OF SYNCHRONIZING SIGNAL

Berton E. Dotter, Jr., Belmont, Calif., assignor to Automatic Electric Laboratories, Inc., a corporation of Delaware Filed Apr. 10, 1967, Ser. No. 629,448
5 Claims. (Cl. 331—14)

ABSTRACT OF THE DISCLOSURE

The output of the controlled oscillator is applied to two separate channels, one of which has a phase corrector circuit responsive to the frequency of the incoming or received signal for applying a phase correction to the oscillator signal in that channel. Both channels have frequency dividers which subdivide the frequency of the signals in the respective channels. A phase comparator is connected to the outputs of the two channels and has its output connected to the frequency control element of the oscillator. The phase corrector circuit is connected to the output of a transition time comparison circuit which has one input coupled to the incoming signal and the other input connected to the channel containing the phase corrector circuit.

BACKGROUND OF INVENTION

This invention relates to oscillators and more particularly to oscillators capable of being synchronized in frequency and phase with a reference signal.

In synchronous data transmission systems, among others, a stable timing clock at the receiver is essential if signal synchronization is to be effected quickly at the receiver following an unintended substantially long interruption in reception of data. Such a clock or timing signal source usually is a crystal oscillator, for example, having moderate or high stability in frequency and phase. For reasons of economy, however, moderately stable oscillators are preferred and various attempts are made to compensate for the lack of stability. Whenever there is an interruption in reception of transmitted data, the clock signal tends to drift in frequency, due to natural effects so that when the transmitted data is again received, the clock and received signals are unsynchronized to a degree depending on the length of the interruption. Until these signals are resynchronized, the data is lost, and so in order to prevent substantial loss of data after an interruption, resynchronization of the incoming and clock signals should desirably be rapid.

An object of this invention is the provision in a synchronous data transmission system of a clock frequency correction circuit having substantially an infinite memory for the frequency characteristic of the received signal at the moment of interruption in transmission.

A further object is to stabilize the frequency of an economical frequency-controlled circuit to prevent loss of phase coincidence and thus eliminate delay in restoring phase coincidence between a timing clock and a received signal after an interruption in data transmission.

SUMMARY OF INVENTION

The frequency of a moderately stable oscillator is controlled by a correction signal derived by comparing the phases of signals in two separate channels fed by the oscillator. One of the channels additionally is responsive to the received signal and so the phase of the signal in that channel reflects the phase of the incoming or received signal. By comparing the phases of signals from the two channels, the difference between the frequency of the oscillator and that of the received signal is detected and the frequency control element of the oscillator is adjusted accordingly by a feedback loop. Thus a change in frequency of the received signal reflected as a phase change in the signal in the one channel produces a corresponding change in the frequency of the oscillator.

When the received signal is lost due to interruption in transmission, the phases of the signals from the two channels become relatively fixed and remain so for the duration of the interruption. As a consequence, during that period the frequency of the oscillator remains fixed at a value equal to the frequency of the received signal at the moment of interruption. This circuit essentially "remembers" the frequency of the received signal throughout the period of interruption, i.e., has a substantially infinite memory, and permits instant synchronization of the received and timing signals upon resumption of transmission or reception. In other words, the moderately stable oscillator is synchronized with the incoming signal when transmission resumes and there is no loss of data transmitted after the interruption.

DESCRIPTION OF THE PREFERRED EMBODIMENT

Figure 1:
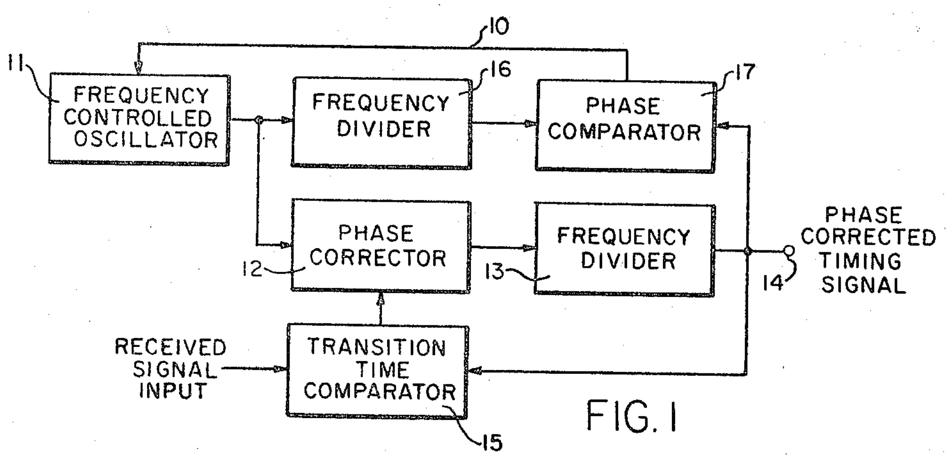
FIGURE 1 is a simplified block diagram showing the parts of the circuit embodying this invention.
Figure 2:
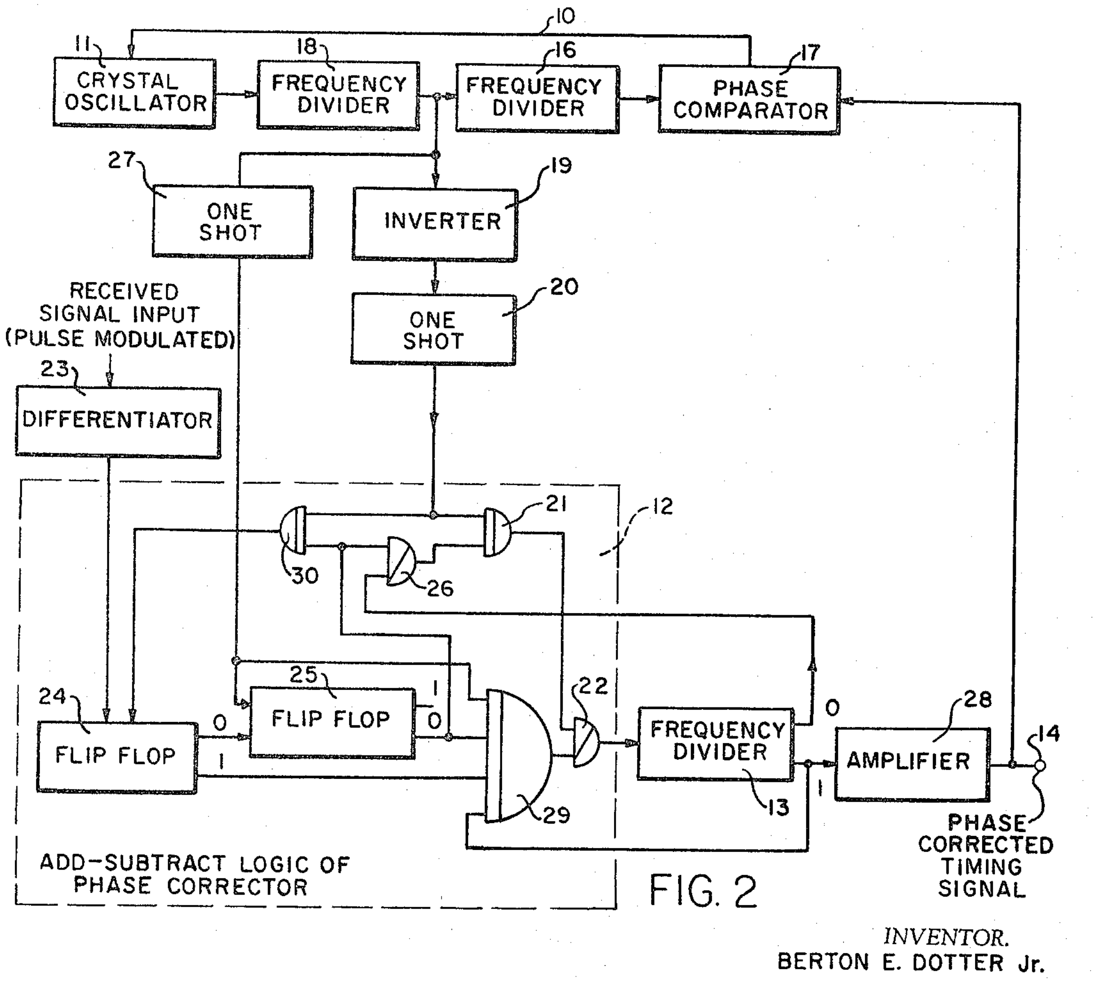
FIGURE 2 is a more detailed block diagram showing a preferred arrangement of components within the phase corrector portion of FIGURE 1.

Referring to FIGURE 1, a tunable oscillator 11 is connected through a phase corrector 12 and a frequency divider 13 to output terminal 14. Typically, a phase-corrected signal is supplied from terminal 14 to a synchronous detector of a pulse-modulated receiver. Oscillator 11 in a preferred embodiment is a crystal-controlled oscillator having a frequency-control element such as a variable-capacity diode in the crystal circuit. The frequency of the oscillator is very accurately controlled within required narrow limits by a direct-current control voltage to the diode. The phase corrector is described in greater detail below with reference to FIGURE 2.

A received signal having a phase to which the phase of the output from terminal 14 is to be adjusted is connected as an input to a transition time comparator 15, and a signal from terminal 14 is connected as another input to this comparator. The output of comparator 15 is connected to phase corrector 12 and controls the latter for changing the phase of the signal from oscillator 11 sufficiently to synchronize the frequency of the signal at terminal 14 with that of the received signal. The function of transition time comparator 15 is in reality performed by the phase corrector as described below, but it is shown separately in FIGURE 1 to aid in a better understanding of the circuit.

When a highly stabilized oscillator is substituted for oscillator 11, blocks 11–13 and 15 comprise a complete synchronized timing signal generator which operates satisfactorily as long as the incoming signal is uninterrupted. Although phase corrector 12 responds rapidly to correct the phase of the timing signal at terminal 14 after an interruption, the first pulses of data transmitted at the normally high rate are likely to be lost because of lack of synchronization of the received and timing signals applied to detection circuits from terminal 14.

Elimination of the requirement for an expensive, highly stabilized local oscillator without sacrificing precise synchronization of the oscillator, especially after an interruption, is achieved with the combination of frequency divider 16 with divider 13 and phase comparator 17. Specifically, the phase-corrected output from terminal 14 is connected as one input to phase comparator 17. The other input to the comparator is an uncorrected version of the oscillator output which is changed by divider 16 to have the same frequency as the output from divider 13. The output of comparator 17 is applied by line 10 to the frequency-control component of oscillator 11 and controls the frequency of the oscillator.

Assume that the incoming signal normally applied to transition time comparator 15 has been absent for such a long period that local oscillator 11 has drifted out of frequency synchronism with the incoming signal. Transition time comparator 15 being responsive to the difference in phase between the incoming signal and that which exists at terminal 14, causes phase corrector 12 to adjust the phase of the signal from the oscillator to compensate for the drift and bring it into synchronism with the incoming signal, as described in detail below. Actually, this phase correction operation continues until the phase difference between the incoming signal and the signal at terminal 14 is so small that the phase-corrected signal is fully effective for application to synchronous detection circuits. Although phase correction is fast, even when a large phase correction is needed, it may not be fast enough to prevent loss of information contained in pulses first received after the interruption.

For usual relatively short transmission interruptions, the phase correction channel comprising phase corrector 12 and frequency divider 16 cooperate with comparator 17 to control the phase of oscillator 11 so that no phase correction is required when the incoming signal is resumed. The phase corrected signal applied to comparator 17 from terminal 14 and which reflects the frequency of the incoming signal immediately prior to the interruption functions as a reference signal against which the oscillator output from divider 16 is compared. The phase comparator therefore responds to signals from a phase-corrected channel and from a phase-uncorrected channel to develop a control voltage on line 10 for gradually synchronizing the frequency of the oscillator with that of the incoming signal. During interruption of incoming signal, phase corrector 12 becomes inoperative so that the relative phases of the inputs to comparator 17 are fixed, the control voltage on line 10 is constant and the oscillator frequency remains unchanged. Thus, the circuit "remembers" the frequency of the incoming signal at the moment of the interruption and holds or locks the oscillator frequency accordingly for the duration of the interruption.

In a preferred embodiment of the invention for use in a digital data communications system, the output of oscillator 11 is a train of pulses at the desired clock frequencies and phase corrector 12 is a digital circuit capable of generating a succession of output pulses. A simplified diagram of a phase corrector used in this preferred embodiment is illustrated in the broken line rectangle in FIGURE 2. Flip-flop, AND, and OR circuits are shown for controlling either the addition or the subtraction (omission) of pulses according to the required phase correction in a train of pulses which is applied to frequency divider 13. The addition or subtraction of pulses causes the phase to be advanced or retarded in predetermined increments representing fractional parts of the pulse width or bit time. Certain inverters and amplifiers that may be required merely to provide the proper polarity and value of voltage for performing enabling or operating functions as described below are not shown.

When the incoming signal is no longer received so that the phase corrector is inoperative, a signal from one-shot multivibrator circuit 20, at intervals controlled by crystal oscillator 11, is passed through a properly conditioned AND gate 21 and OR gate 22 to the input of frequency divider 13. The output of the divider is the desired square-wave timing signal.

The logic control circuits are connected as follows to condition AND gate 21 to pass the output of one-shot 20. Flip-flop 24 has an input connected to differentiator 23 to which the received signal in pulse modulated form is applied. When the differentiated signal is not applied to flip-flop 24, the latter and the flip-flop 25 are in their reset states. The "0" output of flip-flop 25 is connected to one input of OR gate 26, and the output of gate 26 is connected to the other input of AND gate 21. As long as flip-flop 25 is in its reset state, the voltage supplied to gate 21 conditions it to conduct pulses from one-shot 20.

The output of oscillator 11 is connected through frequency divider 18 and inverter 19 to the trigger circuit of one-shot 20. An inverter 19 is required in series with either one-shot 20 (as shown) or one-shot 27 so that these one-shot circuits provide output pulses on different half cycles of the output of frequency divider 18. In this manner, the pulses developed by one-shot 27 occur at times between the pulses from one-shot 20 which normally determines the timing of the system output signal. When the output phase lags, pulses from one-shot 27 can be applied to the input of frequency divider 13 at times between the pulses from one-shot 20. The output of one-shot 20 is connected through conditioned AND gate 21 and OR gate 22 to the input of frequency divider 13. Frequency divider 13, a preferred embodiment having flip-flops and a counter, provides an output pulse after a predetermined number of successive pulses according to the prescribed ratio between input and output pulses. Output pulses of a desired polarity are applied from the "1" output of frequency divider 13 through amplifier 28 to output terminal 14. As long as there is no incoming signal to differentiator 23, the phase correction circuits are inoperative and comparator 17 receives inputs having relatively fixed phases.

The incoming signal applied through differentiator 23 to one input of flip-flop 24 conditions AND gate 29 for conduction. When the phase at the output of frequency divider 13 lags that of the incoming signal, AND gate 29 becomes conductive at intervals as required to conduct a single pulse from one-shot 27 and passes this pulse to OR gate 22 to be added between the pulses of one-shot 20 for application to divider 13. When the phase of the frequency divider 13 output leads rather than lags, AND gate 29 is conditioned not to conduct and not only is one-shot 27 ineffective to add a pulse but a succeeding pulse from one-shot 20 is also omitted, thereby effectively retarding the phase of the output of divider 13. After a time, the number of pulses added or subtracted becomes less until, theoretically, it becomes zero when oscillator 11 and the incoming signal are synchronized in phase and frequency.

A timing circuit embodying this invention does not require a highly stabilized oscillator as a frequency reference at a receiving station and yet the local oscillator remains synchronized with the incoming signal during normal transmission. The phase-corrected timing signal at terminal 14 reflects the frequency of the incoming signal because these signals are phase locked together and the output of divider 16 reflects the frequency of oscillator 11. Thus, the output of comparator 17 is a precise frequency control voltage effective to maintain synchronism. During interruption of the incoming signal, after a sufficiently long reception period to enable the circuit to become synchronized, the phases of the inputs to comparator are relatively fixed and the frequency and phases of the timing signal at terminal 14 remains unchanged. Upon resumption of reception after the interruption, the oscillator output is precisely in phase and has the same frequency as the incoming signal so that no data is lost.

What is claimed is:

1. In a timing signal generator having a phase-corrected output, the frequency at said output to be synchronized with a remote source of reference frequency, said signal generator having a frequency-controlled oscillator, said oscillator having an output and a frequency-control input, a phase corrector connected between said output of said oscillator and said phase-corrected output, phase corrector control means connected to said phase corrector, said phase corrector control means in response to application of a signal from said remote source of reference frequency and also from said phase-corrected output causing said phase corrector to change the phase of the signal applied from said oscillator output to said phase-corrected output until synchronization is obtained between said remote source and said phase-corrected output, a frequency-control circuit including a phase comparator having first and second inputs and an output, said first input being a reference input, said second input being connected to said output of said oscillator, said output of said comparator being connected to said frequency-control input of said oscillator;

the improvement comprising circuit means coupling said phase-corrected output to said first input of said comparator, said comparator responding to the signal applied from said oscillator through both said phase corrector and said frequency-control circuit for maintaining constant the frequency of said oscillator when reception of the signal from said remote source of reference frequency is interrupted.

2. A circuit for maintaining phase and frequency synchronization of a tunable timing oscillator with an incoming electric wave signal before and after interruption of reception of said incoming signal comprising:

comparator means having first and second inputs and an output, the output of said comparator means being connected to said oscillator and operative to control the frequency thereof, a corrector circuit means, means for connecting the output of said oscillator through said corrector circuit means to the first input of said comparator means, means for applying the output of said oscillator without adjustment to the second input of said comparator means, said corrector circuit means being operative in response to reception of said incoming signal to adjust the signal from the oscillator to the first input of the comparator means into synchronism with the incoming signal and being operative during interruption of reception of the incoming signal for passing the signal from the oscillator to the first input of the comparator means without adjustment whereby the frequency of the oscillator remains constant for the duration of the interruption.

3. The circuit according to claim 1 with a digital corrector circuit means for incrementally adjusting the oscillator output into synchronism with the incoming signal.

4. The circuit according to claim 3 in which said comparator comprises a phase comparison circuit having an output proportional to the phase difference of signals applied to the first and second inputs thereof, said corrector circuit means having pulse generating means and means for operatively connecting and disconnecting said pulse generating means to and from the connection of the oscillator to the first input of said phase comparison circuit whereby to advance or retard the phase of the oscillator signal.

5. The circuit according to claim 4 with means for subdividing in a predetermined ratio the frequency of the signal applied to said first and second inputs to said comparator.

References Cited

UNITED STATES PATENTS

| | | | |
|---|---|---|---|
| 3,130,375 | 4/1964 | Rotier et al. | 331—14 |
| 3,204,195 | 8/1965 | Maestre | 331—14 |

JOHN KOMINSKI, *Primary Examiner.*